US012096186B2

(12) United States Patent
Laursen et al.

(10) Patent No.: US 12,096,186 B2
(45) Date of Patent: Sep. 17, 2024

(54) HEARING AID WITH SPEAKER UNIT ASSEMBLY

(71) Applicant: Oticon A/S, Smørum (DK)

(72) Inventors: Bjarne Laursen, Smørum (DK); Bozhidar Kuzhuharov, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 18/121,425

(22) Filed: Mar. 14, 2023

(65) Prior Publication Data

US 2023/0217196 A1 Jul. 6, 2023

Related U.S. Application Data

(63) Continuation of application No. 17/481,913, filed on Sep. 22, 2021, now Pat. No. 11,665,489.

(30) Foreign Application Priority Data

Sep. 23, 2020 (EP) .................................... 20197805
Jan. 28, 2021 (EP) .................................... 21154033

(51) Int. Cl.
*H04R 25/00* (2006.01)
*H01R 13/64* (2006.01)

(52) U.S. Cl.
CPC ........... *H04R 25/604* (2013.01); *H01R 13/64* (2013.01); *H04R 25/556* (2013.01); *H04R 25/609* (2019.05); *H04R 25/65* (2013.01); *H04R 2225/0216* (2019.05); *H04R 2225/57* (2019.05)

(58) Field of Classification Search
CPC ............ H04R 25/556; H04R 2225/021; H04R 2225/0216; H04R 2225/57; H04R 2460/05; H01R 13/26; H01R 13/50; H01R 13/502; H01R 13/506; H01R 13/516; H01R 24/60; H01R 13/424; H01R 13/6273; H01R 13/642
See application file for complete search history.

(56) References Cited

U.S. PATENT DOCUMENTS

| | | | | |
|---|---|---|---|---|
| 7,016,512 | B1 * | 3/2006 | Feeley | H04R 1/10 381/322 |
| 7,329,145 | B2 * | 2/2008 | Yagome | H01R 13/5219 439/271 |
| 8,311,252 | B2 | 11/2012 | Dittli et al. | |
| 8,638,965 | B2 | 1/2014 | Higgins et al. | |
| 9,124,049 | B2 * | 9/2015 | Yuen | H01R 13/6581 |
| 10,306,384 | B2 * | 5/2019 | Larsen | H04R 25/604 |
| 10,567,892 | B2 | 2/2020 | Møller et al. | |
| 10,575,106 | B1 * | 2/2020 | Bergmann | H04R 25/505 |
| 10,863,285 | B2 * | 12/2020 | Schmidt | H04R 25/60 |
| 11,101,596 | B1 * | 8/2021 | Lin | H01R 13/521 |
| 2018/0358755 | A1 * | 12/2018 | Sakaizawa | H01R 13/6273 |

(Continued)

FOREIGN PATENT DOCUMENTS

| | | | | |
|---|---|---|---|---|
| KR | 10-2015-0028690 A | | 3/2015 | |
| KR | 20150028690 A | * | 3/2015 | |

*Primary Examiner* — Ryan Robinson
(74) *Attorney, Agent, or Firm* — Birch, Stewart, Kolasch & Birch, LLP

(57) ABSTRACT

The present disclosure relates to a hearing aid and detachable speaker unit assembly. The detachable speaker unit assembly comprises a fastening structure to provide an enhanced removal force and stable insertion into the ear canal of the user.

19 Claims, 5 Drawing Sheets

(56) References Cited

U.S. PATENT DOCUMENTS

| | | | | |
|---|---|---|---|---|
| 2020/0213787 | A1 | 7/2020 | Houcek et al. | |
| 2021/0185460 | A1* | 6/2021 | Bhat | A61B 5/02055 |
| 2021/0257769 | A1* | 8/2021 | Sakoda | H01R 13/5213 |
| 2021/0306778 | A1* | 9/2021 | Rasmussen | H04R 25/50 |
| 2021/0408741 | A1* | 12/2021 | Chen | H01R 24/60 |

* cited by examiner

HEARING AID WITH SPEAKER UNIT ASSEMBLY

This application is a Continuation of copending application Ser. No. 17/481,913, filed on Sep. 22, 2021, which claims priority under 35 U.S.C. § 119(a) to Application No. 20197805.3, filed in Europe on Sep. 23, 2020 and Application No. 21154033.1, filed in Europe on Jan. 28, 2021, all of which are hereby expressly incorporated by reference into the present application.

The present disclosure relates to a hearing aid assembly comprising a hearing aid having a housing configured to be positioned behind the ear, or pinna, of a user, and an in-the-ear part having a housing configured to be positioned in the ear canal of the user, a connecting part and a connector connecting the connecting part to the behind-the-ear housing. More particularly, the disclosure relates to a plug and socket connector system for a hearing aid assembly. The present disclosure provides at least an alternative to the prior art.

In hearing aids configured to be positioned behind the ear of a user, the so-called RITE or RIE styles, an output transducer placed in the ear canal of the user is electrically connected to a processor positioned in a housing configured to be positioned behind the ear of the user, i.e. in the volume or area between the pinna and the skull. The connector is detachably connected to the behind-the-ear housing, which allow different types/sizes of output transducers to be provided whit a range of different lengths of wires. This allow a hearing health care professional to select an output transducer capable of delivering a suitable sound pressure to the ear canal of the user and having a suitable length so that the connector is not too visible, i.e. that the connector lie as much as possible towards the skull of the user. The part comprising the connector, connecting part and in-the-ear housing is sometimes referred to as simply the speaker unit. In the present context, the term 'detachable speaker unit' is used for the assembly comprising the connecting part, the connector and the in-the-ear housing, i.e. the part of the complete hearing aid assembly that is not the behind-the-ear housing.

Generally, a hearing aid may comprise a hearing aid housing including an input transducer configured to convert sound signals into electrical signals, a signal processor configured to process the electrical signals from the input transducer and a hearing device connector. The hearing aid may further comprise a detachable speaker unit. The detachable speaker unit may further comprise a connector part having a set of contact pins for contacting the hearing device connector. The detachable speaker unit may further comprise a connecting element having an electrically conductive member, the connecting element connected to the connector part. The detachable speaker unit may further comprise a speaker unit housing configured to be positioned at least partly in the ear canal of the user. The detachable speaker unit may further comprise an output transducer included in the speaker unit housing, the output transducer being configured to provide an acoustic signal based on the processed signal from the signal processor, the speaker unit housing being connected to the connecting element.

Detachable speaker units used in connection with hearing aid devices need to operate in a harsh environment where different fluids, wax, sweat, cleaning agents, may be present. Connections need to have the interfaces sealed from any of these chemicals. As a hearing aid has an expected lifetime of around 5 years, there is a need for connections that remain stable for as long as possible during this period. This is supported by a detachable speaker unit according to the present disclosure which provides a stable insertion and removal force, also, the interface between a detachable speaker unit and a behind-the-ear housing according to the present disclosure provides an interface that is small and provides mechanical alignment of the parts and reduce the risk of misuse and misalignment due to incorrect handling of the hearing aid system, thus increasing the expected lifetime of the detachable speaker unit and/or hearing aid housing.

The hearing aid housing does not need to include an input transducer, but often do. An additional, or only, input transducer may be included in the in-the-ear housing of the detachable speaker unit. When having an input transducer located behind the pinna and one located at the ear canal, either at the air side or facing the eardrum, advantageous microphone patterns may be obtained. This configuration e.g. allows for an improved noise cancellation of the surroundings when the combined microphone system is configured to obtain a signal representing the user's own voice.

Additional components may be present in the in-the-ear housing, specifically components such as a sensor, being e.g. an acceleration sensor, a temperature sensor, a PPG sensor, a microphone or another type of sensor, or a combination hereof. Additionally, a processor configured to at least partly process signals obtained from the sensor may also be included in the in-the-ear housing. A component such as an identification component providing a signal indicative of either the type, i.e. size and/or output power, or an individual identification of the specific detachable speaker unit may be included. Other information stored in, or in connection with, the identification component may include corrective information relating to the output characteristic of the detachable speaker unit, e.g. calibration data for either the specific output transducer or the output transducer type/size. This corrective information may then be inputted to the processor so that processing of sound is processed for an improved output sound to the user. The identification component may be incorporated in other components, such as an in-the-ear processor.

The hearing aid housing and the connector part may be formed as mating parts so as to achieve a suitable retention force when the detachable speaker unit is attached to the hearing aid housing.

According to an aspect, the present disclosure provides a hearing device comprising a behind-the-ear housing, the behind-the-ear housing comprises a housing connector. The behind-the-ear housing includes an input transducer configured to convert acoustic sound into an electrical signal. The behind-the-ear housing comprising a processor configured to process the electrical signal in accordance with a hearing loss of a user. The hearing device further comprises a detachable speaker unit having a speaker unit connector configured to mate with the housing connector, the detachable speaker unit comprising an output transducer arranged in an in-the-ear housing. The speaker unit connector may comprise a first plurality of electrical contacts distributed at two inner surfaces of a speaker unit connector cavity. The housing connector may comprise a second plurality of housing connector contacts arranged in a housing connector cavity. The housing connector contacts may extend into the housing connector cavity. The housing connector cavity and speaker unit connector electrical contacts may be configured to establish electrical contact when the speaker unit connector and the housing connector are in mechanical connection. Further, a loop structure may be formed at an outer surface of the housing connector and shaped to contact a protruding structure on an outer surface of the speaker unit connector.

Alternatively, the loop structure may be formed at an outer surface of the speaker unit connector and correspondently the protruding structure could be formed on the outer surface of the housing connector. The hearing device according to the present disclosure is contemplated to provide a retention force (pull resistance) in the range of 5-15 N, such as around 10 N. An advantage of having such a loop and protruding structure is that it allows for a stable connection, such that when the user pulls the wire (to e.g. adjust it or insert it), the connection isn't unintentionally detached. The loop/protrusion further allows for a secure connection, as it requires a controlled and intentional force to disassemble. This means that the hearing aid won't accidentally fall apart during unexpected times. Another advantage is that the loop/protrusion arrangement can be operated without the need for tools, which makes handling the hearing aid more convenient for both the user and the health care professional. Further, since the size of hearing aids is preferably as small as possible, the mechanical alignment of the very small connector is very important. An advantage of a hearing aid connector system as described herein is that such mechanical alignment is made easy and thus less likely to be exposed to human error. This allows for an easier insertion and mounting of the hearing aid, which is beneficial for all hearing aid users, and especially for those who are very young, old, or suffer from decreased fine motor skills. Another advantage of a stable connector system is that it doesn't disconnect during everyday use, such as when moving the head/jaw or when touching the ear area. Having a stable connector means that the user does not have to worry about their hearing aid failing them or falling out.

The housing connector could comprise a centrally positioned part extending into the housing connector cavity and wherein the second plurality of housing connector contacts are then arranged at the centrally positioned part. The centrally positioned part could be configured to be received in the speaker unit connector cavity. This could provide an enhanced resistance to failure when/if the speaker unit is subjected to forces not being in the lengthwise direction, i.e. along the longitudinal direction of the plug-socket connector of the detachable speaker unit and hearing aid housing.

The housing connector cavity may comprise a first protrusion extending into the housing connector cavity and the speaker unit connector comprises a track mating the first protrusion. This is contemplated to reduce the risk of inserting the speaker unit connector in an unintended orientation, and might provide some degree of rotational resistance.

The hearing aid user, who might be of old age and perhaps has decreased fine motor skills, benefits from a connector system that is both easy to insert correctly, and doesn't unintentionally detach when touching the hearing aid (such as when scratching the ear/head).

The housing connector cavity may comprises a second protrusion extending into the housing connector cavity and the speaker unit connector comprises a second track mating the second protrusion, the first protrusion and the second protrusion may then be arranged at a first side of the housing connector cavity.

The housing connector cavity may have a rectangular cross-section geometry, which could mean that the first protrusion and the second protrusion could be arranged at respective corners of a long side of the rectangular cross-section geometry. In this instance, the long side could then e.g. constitute the first side mentioned above.

The housing connector may advantageously be made from a heat resistant material. The housing connector may be made from e.g. PEEK, PA9T, PA10T, LCP, or other suitable material. The speaker unit connector may be made from the same material as the housing connector, or e.g. from a nylon type material. Both the housing connector and the speaker unit connector could be made from a material that resist the chemicals that are most often present at the ear/pinna, namely, ear wax, sweat, isopropanol, sun lotion, etc.

The speaker unit connector may be provided with a gasket or sealing arranged to contact a surface of the housing connector in a mounted state. The gasket, or seal, may be made from silicone, or other such suitable material, that provides some degree of compressibility.

An advantage of having a sealing arrangement is that it protects the hearing aid connector from the inevitable fluids that daily com in contact with the hearing aid, such as wax, sweat or any other fluid (e.g. lotions, shampoos etc. that contain harsh chemicals) that the user might come in contact with on a regular basis. Thus, the life expectancy of the hearing aid is prolonged.

The first plurality of housing connector contacts could be spring contacts. The spring contacts are contemplated to be advantageous in that they are not too prone to wear and allow for some degree of freedom as some parts could be subject to production inaccuracy.

The first plurality and the second plurality might be equal, alternatively, wherein the first plurality and the second plurality could be not equal. In some instances the number of connection possibilities in the hearing aid housing side may be different from the actual number of connection possibilities on the detachable speaker unit side.

The first plurality and the second plurality may be an even number, such as eight, alternatively, the first plurality and the second plurality may be an uneven number, such as 7 or 9. The precise number of connections may be dependent on the number of elements in the in-the-ear housing, which may include the output transducer, one or more sensors, a processor. Each of these may require their own unique number of connections. There may be provided a common ground connection. Each, or some, of the components in the in-the-ear housing may be provided with two electrical connections, e.g. the output transducer may be provided with a set of two connections, a microphone in the in-the-ear part may be provided with two connections, a processor may be provided with a number of connections, such as three, four or even more.

In the speaker unit connector, an electrical component may be provided. This could specifically be a memory device configured to allow the hearing aid to identify the type of speaker unit that is attached at a give time, or to allow the hearing aid to be informed which types of sensors are available in the in-the-ear housing. Communication with a processor in the in-the-ear housing may be performed via a buffer-like system arranged in the in-the-ear housing.

The housing connector may comprise a second loop structure arranged at an opposite side of the loop structure and the speaker unit connector may then comprise a second protruding structure arranged opposite the protruding structure and shaped to contact the second protruding structure. The loop structure and the second loop structure may be arranged symmetrically so as to provide an improved detachment force.

A RF antenna may be formed in the hearing aid. Such an antenna may have a part extending in the detachable speaker unit, such as formed in at least one of a number of wires or conductors in a connecting member mechanically and electrically connecting the behind-the-ear housing and the in-the-ear housing. A part of the RF antenna may be formed in the behind-the-ear housing, such as all of the RF antenna or substantially all of the RF antenna.

In a second aspect, the present disclosure relates to a detachable speaker unit assembly having a speaker unit connector configured to mate with a housing connector of a behind-the-ear hearing aid housing. The detachable speaker unit according to the second aspect may comprise an output transducer arranged in an in-the-ear housing, wherein the speaker unit connector may comprise a first plurality of electrical contacts distributed at two inner surfaces of a speaker unit connector cavity. A protruding structure may be formed on an outer surface of the plug housing of the speaker unit connector and shaped to contact a loop structure formed at an outer surface of the housing connector of the behind the ear housing. In the alternative, the loop structure and protruding structure may be formed on the opposite structures, i.e. the loop may be formed on the speaker unit connector and the protruding structure may be formed on the housing connector.

A multitude of electrical conductors may be connected to a substrate in the speaker unit connector, and wherein a multitude of electrical conductors may be assembled in a cable structure electrically and mechanically connecting the speaker unit connector with the in-the-ear housing.

The detachable speaker unit assembly may further comprise a sensor arranged in the in-the-ear housing. Such a sensor may be a temperature sensor, an accelerometer, a PPG sensor, a microphone, or a combination hereof.

The hearing aid connector system as described herein allows for an easy, correctly aligned, insertion while still being stable enough that it doesn't fall out unintentionally, yet is simple to remove without tools.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
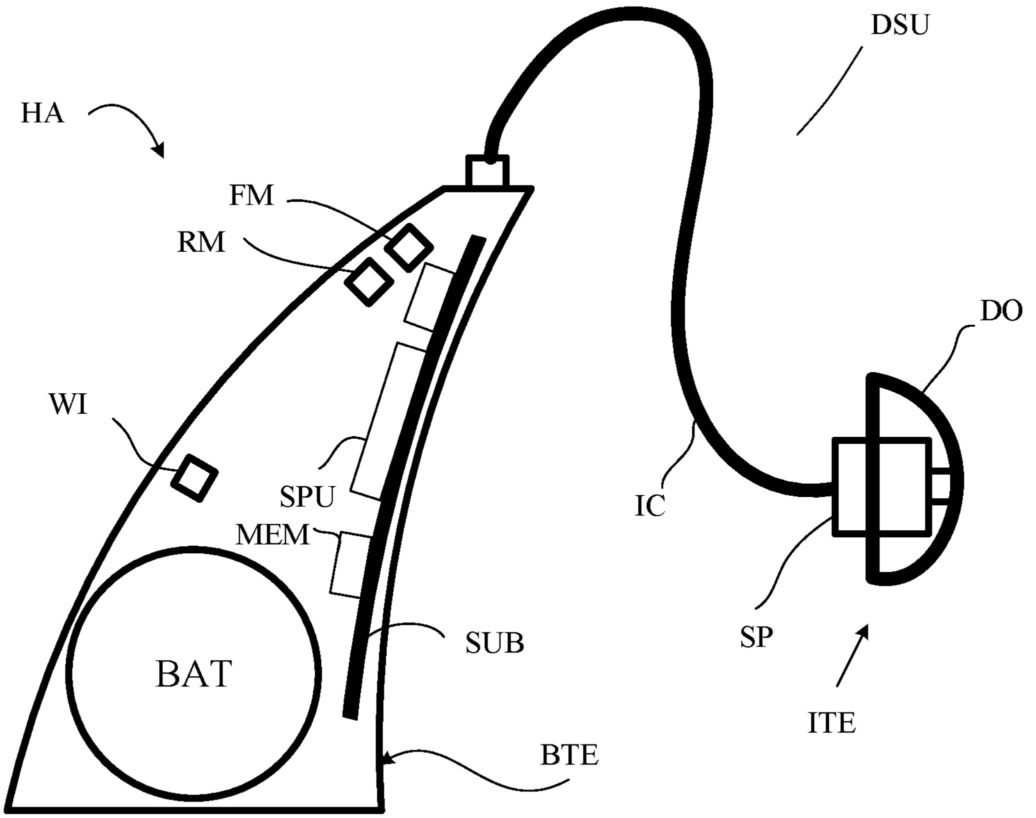
FIG. 1 schematically illustrate a hearing aid.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid, or hearing device (or hearing instrument, hearing assistance device) may be adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant. The hearing device may be implemented in one single unit (housing) or in a number of units individually connected to each other.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

FIG. 1 schematically illustrate a general view of a hearing aid HA, having a behind-the-ear (BTE) housing BTE and a detachable speaker unit DSU attached thereto.

Figure 2:
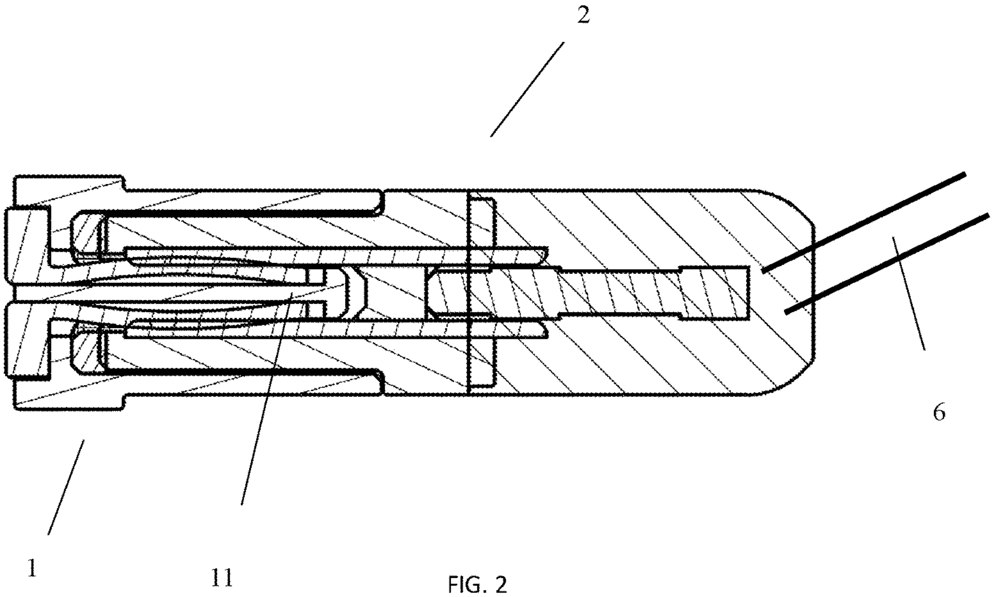
FIG. 2 is a schematic illustration of a housing connector and speaker unit connector in an assembled state.
Figure 3:
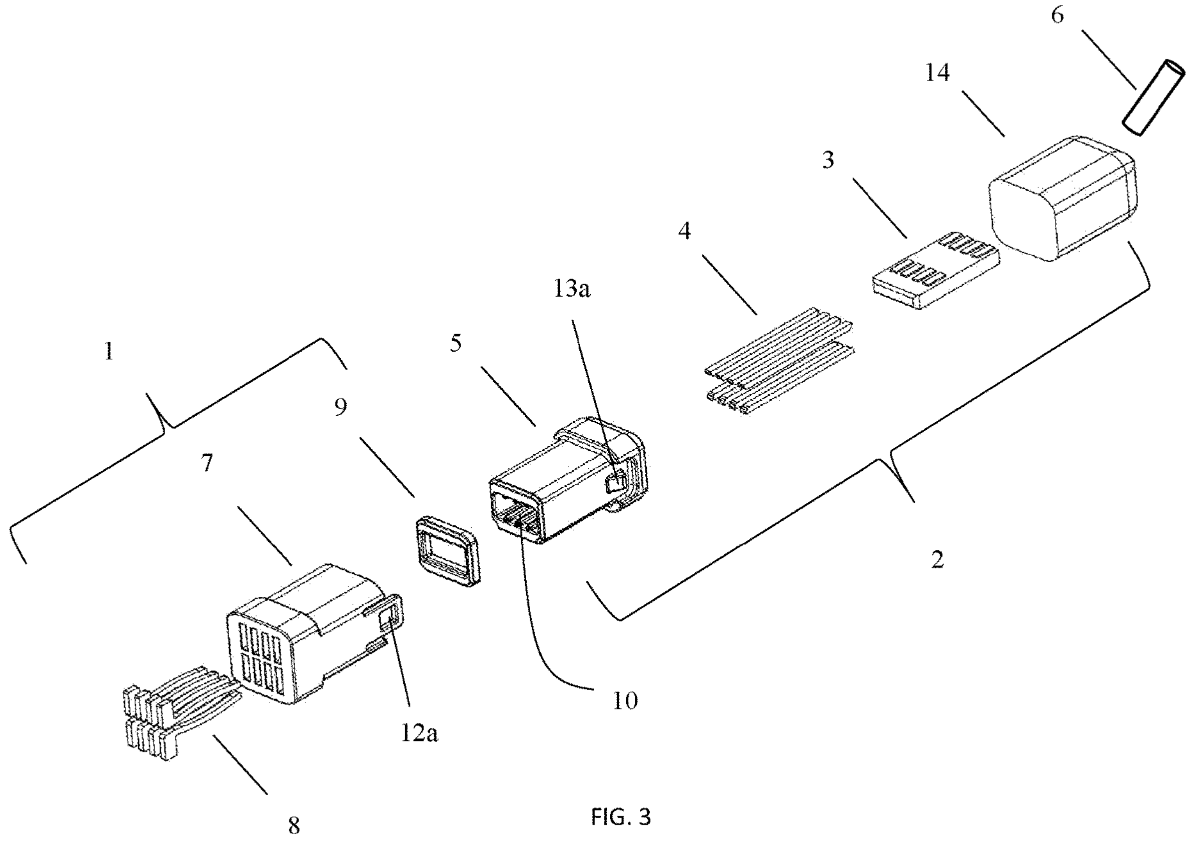
FIG. 3 is an exploded view of housing connector and speaker unit connector.

FIG. 2 is a schematic illustration of a housing connector 1 and speaker unit connector 2 in an assembled state. The cable assembly 6 in FIG. 2 corresponds to the connecting member IC in FIG. 1. In FIG. 3, where an exploded view of the components in FIG. 1 is illustrated, it is also seen that a PCB 3 connects contact pins 4 arranged in the speaker unit connector housing 5 with a cable assembly 6 at the right-most end illustrated. The PCB 3 and speaker unit connector housing 5, and cable assembly 6, are mechanically connected via an overmold 14 applied to the parts.

The housing connector 1 comprises a socket housing 7, 8 contact springs 8 and a sealing gasket 9. The speaker unit connector 2 comprises a plug housing 5 with 8 contact pads 10 in-moulded, a PCB 3 soldered to the contact pads 10, an 8-litz wire cable soldered to the other end of the PCB 3, and an encapsulating overmold 14 of the PCB 3 and speaker unit connector housing 5.

Now referring to FIG. 1, which schematically illustrates a behind-the-ear hearing aid HA device. The behind-the-ear housing BTE comprises a microphone system including a front FM and a rear RM microphone each configured to convert acoustic sound into electrical signals. The signal or signals from the microphone system are fed to a processor SPU. The processor SPU is configured to process the electrical signals so as to compensate for the user's specific hearing loss. The processed signal is provided to an output transducer SP located in an in-the-ear housing ITE. The in-the-ear housing ITE is connected via a connecting member IC to the behind-the-ear housing BTE. The connecting member IC is, relatively, flexible so that the user may place the in-the-ear housing ITE in the ear canal and the behind-the-ear housing BTE in the area between the pinna and the skull of either the left or right ear in a comfortable manner. A connector connects the connecting member IC to the behind-the-ear housing BTE. The connector, the connecting member IC and the in-the-ear housing ITE is in the present context termed a detachable speaker unit DSU. The detachable speaker unit DSU is provided to a hearing health care professional in a variety of lengths and output transducer SP sizes so that the hearing health care professional may chose an appropriate length and output transducer size combination that is suitable for the particular user.

Additionally, the hearing aid HA may comprise wireless interface units WI for allowing the hearing aid HA to communicate wirelessly to external components and/or an ipsilateral hearing aid located at the other/distant ear of the user. The wireless communication may include high frequency communication, e.g. at 2.4 or 5 GHz, and/or lower frequency/inductive communication units, such as at frequencies in the range 900 Hz to 10 MHz. Further, the hearing aid HA may include a telecoil configured to receive baseband modulated signals from installations e.g. at churches, cinemas, ticket booths etc. As can be seen in FIG. 1, the hearing aid HA may also comprise a memory unit MEM and a battery BAT.

According to the present disclosure, a hearing device HA comprising a behind-the-ear housing BTE is provided. The behind-the-ear housing may include the features mentioned in relation to FIG. 1. The behind-the-ear housing BTE comprises a housing connector 1. The behind-the-ear housing BTE includes an input transducer (not shown) configured to convert acoustic sound into an electrical signal and a processor SPU configured to process the electrical signal in accordance with a hearing loss of a user. The hearing loss of the user may be provided via a hearing healthcare professional and stored in the hearing aid via a fitting software. The hearing loss information may be provided via a test performed by the user him- or herself and the setting obtained therefrom may be used as input for the hearing loss compensation processing.

A hearing device HA according to the present disclosure comprises a detachable speaker unit DSU having a speaker unit connector 2 configured to mate with the housing connector 1, such a plug-and-socket set is illustrated in FIG. 2. FIG. 2 is a schematic view of a socket, i.e. housing connector 1, and a plug, i.e. detachable speaker unit connector 2, in an assembled state.

As is also illustrated in FIG. 1, the detachable speaker unit DSU comprises an output transducer SP arranged in an in-the-ear housing ITE. This is often termed a speaker in the context of hearing aids. The output transducer SP provides an acoustic signal which is inputted to the user's ear canal. In alternative embodiments, an output transducer may have other types of output, such as vibrations applied (directly) to the skull of the user, electrical signals provided to the cochlea or other types of output.

Figure 6:
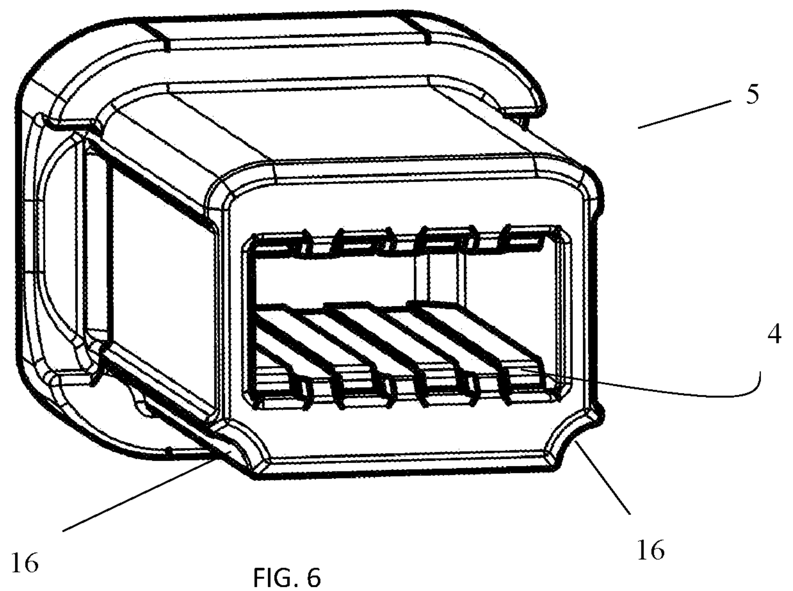
FIG. 6 is a schematic view of a speaker unit connector.

FIG. 3 illustrates an exploded view of the components of the housing connector 1 and the speaker unit connector 2. As can be seen, the speaker unit connector 2 comprises a first plurality of electrical contacts 4 distributed at two inner surfaces of a speaker unit connector cavity of the housing 5. Here the first plurality 4 is eight, where four are arranged at two opposing sides of the speaker unit connector cavity. FIG. 6 is a schematic view into the speaker unit connector cavity of the housing 5, where the electrical contacts 4 can be seen in more detail. It is seen that four electrical contacts 4 are arranged at a top side surface and four electrical contacts 4 are arranged at an opposite, bottom side surface. The electrical contacts 4 are arranged in pairs opposite each other. Other arrangements are possible, e.g. there need not be an even number of contacts, it is possible that one side has more or less contacts than the other side. It is equally possible that not all electrical contacts are arranged at opposite sides, there could be a number of electrical contacts at one or both of the side wall connecting the top and bottom side walls of the cavity of the housing 5.

Figure 4:
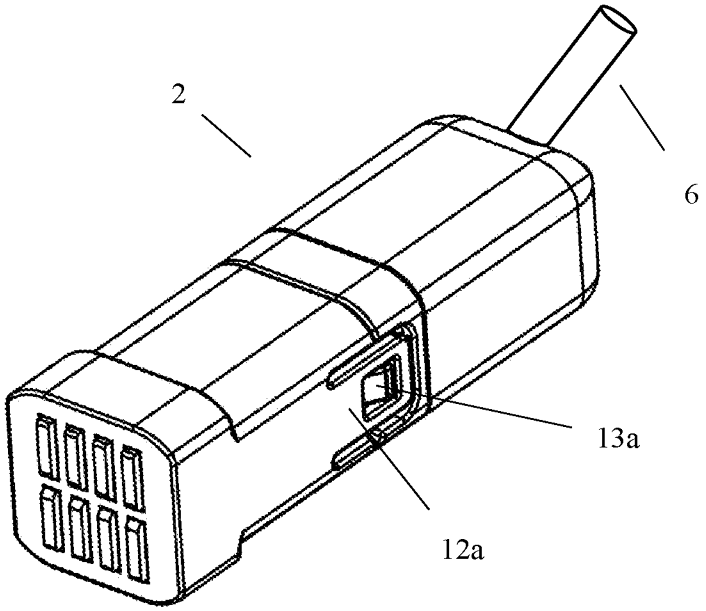
FIG. 4 is a schematic perspective view of a housing connector and speaker unit connector in an assembled state.
Figure 5:
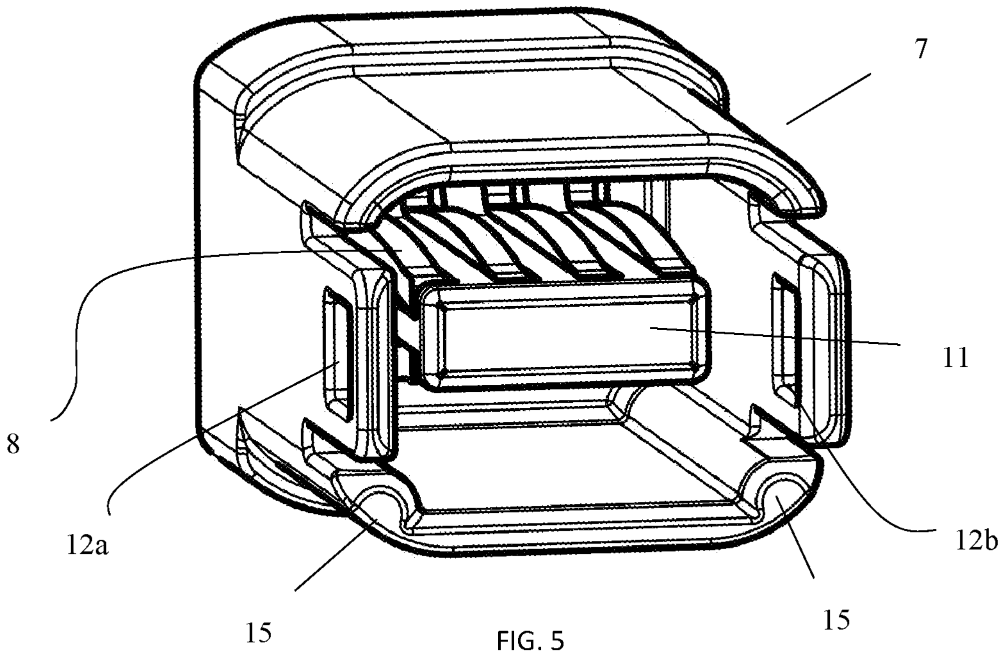
FIG. 5 is a schematic view of a housing connector.

As illustrated e.g. in FIG. 5, the housing connector 1 comprises a second plurality of housing connector contacts 8 arranged in a housing connector cavity of the socket housing 7. Here the second plurality 8 is equal to the first plurality 4, i.e. eight contacts. However, it could be envisioned that a different number of contacts could be needed, e.g. for specific hearing aid models which supports one number of functions in a detachable speaker unit DSU, whereas a specific, low cost model of a detachable speaker unit only provides a low number of functions, such as no sensor, whereas a higher cost model detachable speaker unit provides a sensor, or even multiple sensors and/or in-ear processor, functionality and thus require a higher number of connections. The housing connector contacts 8 are extending into the housing connector cavity, this is illustrated e.g. in FIG. 5 where the housing connector contacts 8 are arranged on an extending body 11 extending from the backwall of the cavity. The housing connector contacts 8 are arranged at opposite sides of the extending body 11. The housing connector contacts 8 are here spring contacts, but other shapes and types could be applied. The extending body 11 mates with the cavity of the speaker unit cavity of the speaker unit connector housing 5. The electrical contacts 8 in the housing connector 1 cavity and the electrical contacts 4 of the speaker unit connector 2 are configured to establish electrical contact when the speaker unit connector 2 and the housing connector 1 are in mechanical connection, i.e. when the speaker unit connector housing 5 is inserted into the housing connector 1 (as seen for example in FIGS. 2 and 4). Thereby an electrical connection from the processor SPU in the behind-the-ear housing BTE and the output transducer SP and/or other components, such as sensor and/or processor, in the in-the-ear housing ITE may be established.

Further, as is seen on the side of the housing connector 1 in FIG. 5, a loop structure 12 is formed at an outer surface of the socket housing 7 and shaped to contact a protruding structure 13 on an outer surface of the plug housing 5 of the speaker unit connector 2, which is shown in e.g. both FIGS. 3 and 4. The loop 12 and protruding structure 13 form a snap-like connection providing a higher retention force so that when the user pulls the wire IC connecting the in-the-ear housing ITE and the behind-the-ear housing BTE, e.g. for removal or mounting of the hearing aid HA on the ear, the risk of the detachable speaker unit DSU being unintentionally detached is low.

As is also illustrated in FIG. 3, a sealing member 9, sealing ring or seal structure, is here provided and arranged so that when the speaker unit connector housing 5 is attached to the housing connector 1, the seal 9 ensures that moist and/or debris is not allowed to enter the connector. The seal 9 is compressed by the housing connector 1 and speaker unit connector 2 in the assembled state. The locking provided by the loop structure 12 and the protruding part 13 help compress the gasket 9. The forces exerted to the gasket 9 by movement from e.g. the wire assembly 6 will not wear out the gasket 9. Further, the gasket 9 does not impact the tactility of the locking function. The locking achieved by the loop 12 provides an easy insertion of the speaker unit connector 2 and requires a controlled force to disassemble the housing connector 1 and the speaker unit connector 2.

The area at the pinna is often prone to dirt, sweat, cerumen and other kinds of dirt, and the ingress of such substances into the connector lowers the longevity of the hearing aid as such, either requiring a new detachable speaker unit or even repair or replacement of the behind-the-ear housing itself. The average lifetime of a hearing aid is presently around 5 years, which require the connecting system to be stable, less prone to damage from ingress material and/or mechanical wear.

The length of the speaker unit connector 2 is in the range of 6 mm to 10 mm, preferably 8.3 mm, measured from the end where the wire connects, i.e. the end facing out of the ear canal when the detachable speaker unit is mounted in the ear canal, and to the distal end of the speaker unit connector housing 5. The depth of the housing connector 1 is in the range of 3 mm to 6 mm, preferably 4.96 mm, allowing for providing a mechanically stable connection which is stable even when the user pulls in non-lengthwise directions relative to the connector assembly direction. As is also illustrated in e.g. FIG. 4, the wire 6 is angled relative to the back of the speaker unit connector 2. When the user pulls the in-the-ear housing ITE out of the ear canal, e.g. in a mainly upwards direction in FIG. 4, a force which is not mainly directed in the lengthwise direction is exerted on the speaker unit connector 2, which may twist the speaker unit connector housing 5, e.g. upwards in FIG. 4. If the connection between the speaker unit connector housing 5 and the housing connector 1 is not able to resist this twist, the speaker unit connector 2 will be dislodged from the housing connector risking that the detachable speaker is left in the ear canal of the user. The combination of the relatively long plug-socket connection and the loop(s) provide a reliable connection of a detachable speaker unit to behind-the-ear housing.

The housing connector 1 illustrated here comprises a centrally positioned part 11 extending into the housing connector cavity, as mentioned in relation to FIG. 5 above. Also, this part is seen as the central most part in FIG. 2, this is the part that is between the two contact pins in the center of the housing connector 1. All or most of the second plurality 8 of housing connector 1 contacts may be arranged at the centrally positioned part 11. The centrally positioned part 11 is configured to be received in the speaker unit connector cavity, as illustrated e.g. in FIG. 2.

In FIG. 5, it is seen that the socket housing comprises a first protrusion 15 extending into the housing connector cavity, i.e. the protrusion extending at the lower, left corner of the housing connector cavity. The protrusion 15 extends into the cavity towards the speaker unit connector housing 5 when this is mounted into the housing connector 1. Correspondingly, the speaker unit connector 2 comprises a track 16 (as described herein with reference to FIG. 6) mating the first protrusion 15. The protrusion 15 guides the speaker unit connector 2 when the speaker unit connector housing 5 is inserted into the cavity of the housing connector 1. Further, placement of the protruding part 11 ensures that the speaker unit connector 2 is inserted with the correct pins 4 facing the corresponding connectors 8 in the housing connector 1. Even though the housing connector 1 and speaker unit connector 2 in general could be connected 'upside-down' the connections have specific functions which may not be desirable to have to detect electrically. The connector could be shaped so that either side of the speaker unit connector 2 could face either side of the housing connector 1, that is, it would not matter which side were up and which were down, however, this could result in some unwanted complexity in the electronic side of the hearing aid HA, and this complexity is reduced with this protrusion 15 and track 16. Providing one or two protruding parts 15, e.g. at two neighboring corners of the generally rectangular cross-section of the housing connector 1 provides correct rotational orientation of the speaker unit connector 2 with reduced risk of misalignment. Here it is illustrated that the housing connector cavity has a rectangular cross-section geometry, and that the first protrusion 15 and the second protrusion 15 are arranged at respective corners of a long side of the rectangular cross-section geometry. However, it could be provided at that the first protrusion 15 and the second protrusion 15 are arranged at respective corners of a short side of the rectangular cross-section geometry. Even further, three protrusions arranged at respective three corners of the rectangular cross-section geometry could be provided, and even further, one or more protrusions 15 could be provided at any location between the corners of such a rectangular geometry. It could also be envisioned that one or more the protrusions 15 where formed on the speaker unit connector 2 and corresponding track 16 or indention 16 were formed in the housing connector 1.

In the figures, the first plurality 4 and the second plurality 8 of contacts are illustrated as being an even number, here eight, other numbers of contacts could be used, such as 4 to 12 or even more. It could be envisioned that the first plurality 4 and the second plurality 8 could be an uneven number, such as 7 or 9, or other number.

As mentioned, it could be advantageous that the speaker unit connector 2 comprises an electrical component, such as a sensor and/or processor. The in-the-ear housing ITE could comprise a second input transducer, this could be used as part of the input transducer system for the hearing aid device, e.g. a combination of one or more of the input transducers/microphones in the behind-the-ear housing and the at-the-ear-canal microphone. Such a configuration could be useful for certain signal processing tasks such as own-voice pickup and/or feedback reduction.

As is seen e.g. in FIG. 5, the housing connector 1 comprises a second loop structure 12*b* arranged at an opposite side of the loop structure 12*a* and the speaker unit connector 2 comprises a second protruding structure (not shown) arranged opposite the protruding structure 13*a* and shaped to contact the second loop structure 12*b*. By having a symmetrical location of such two loop structures 12*a*, 12*b* and protruding structures 13*a*, 13*b*, a better performing locking action is achieved. This help reduce the risk of the detachable speaker unit being unintentionally detached from the behind-the-ear housing, such as during handling of the hearing aid by e.g. the user or a hearing healthcare professional.

Generally, the detachable speaker unit DSU assembly illustrated and discussed herein have a speaker unit connector 2 configured to mate with a housing connector 1 of a behind-the-ear hearing aid housing BTE. The detachable speaker unit DSU comprises an output transducer arranged in an in-the-ear housing ITE. The speaker unit connector 2 comprises a first plurality of electrical contacts 4 distributed at two inner surfaces of a speaker unit connector cavity. A protruding structure 13*a*, 13*b* is formed on an outer surface of the plug housing 5 of the speaker unit connector 2 and shaped to contact a loop structure 12*a*, 12*b* formed at an outer surface of the housing connector 1 of the behind the ear housing BTE. As is understood above, the loop 12*a*, 12*b* and protruding structure 13*a*, 13*b* may be reversed, meaning that the loop structure 12*a*, 12*b* may be formed on the speaker unit connector 2 and the protruding structure 13*a*, 13*b* may be formed on the housing connector 1.

Figure 7:
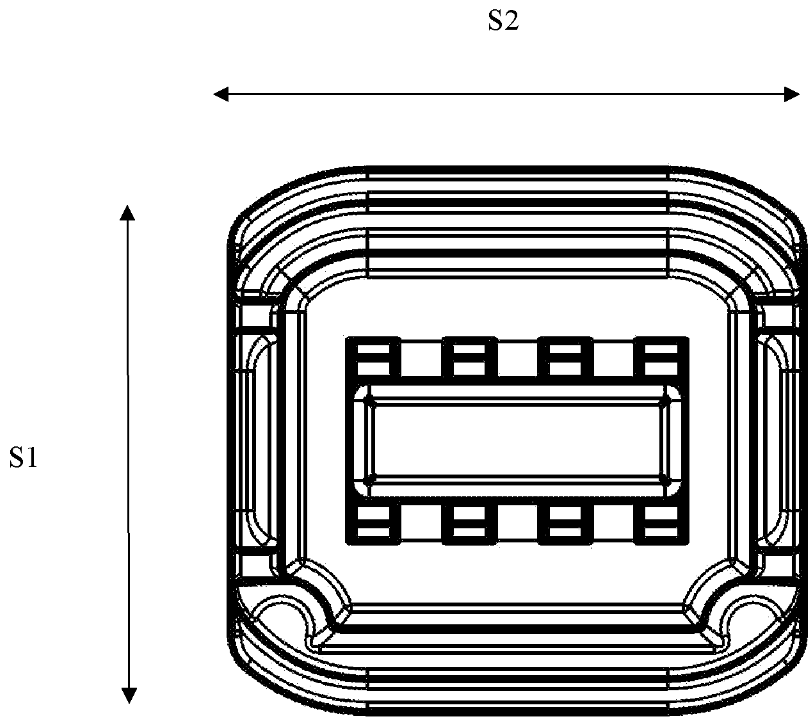
FIG. 7 is a schematic view of a housing connector.
Figure 8:
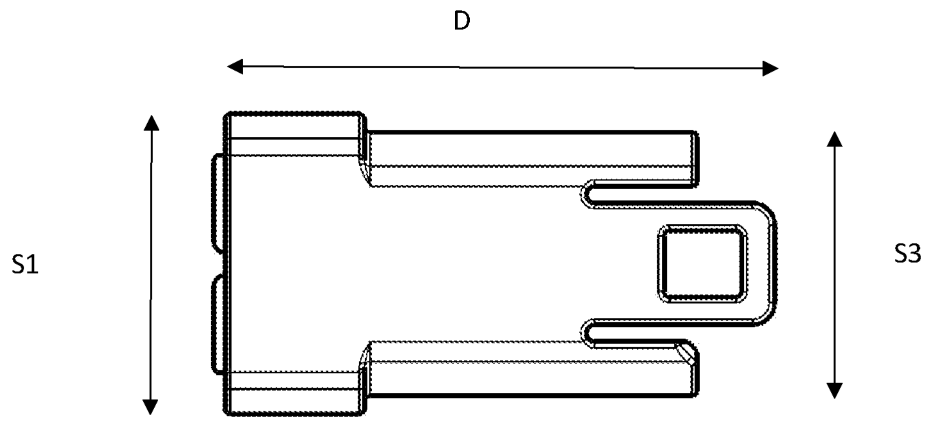
FIG. 8 is a schematic view of a housing connector.

FIG. 7 and FIG. 8 illustrate two schematic views of a housing connector 1, from the front and from the side. The depth D of the housing connector 1 is preferably around 4.5 mm to 5 mm. The sides S1 and S2 are preferably between 2 mm and 3 mm. D1 and/or D2 could for example be 2.86 mm or 2.71 mm. S1 and S2 could be equal, or have different sizes. The length S3 of the house connector 1 is preferably between 2.2 mm and 2.5 mm, preferably 2.38 mm.

Figure 9:
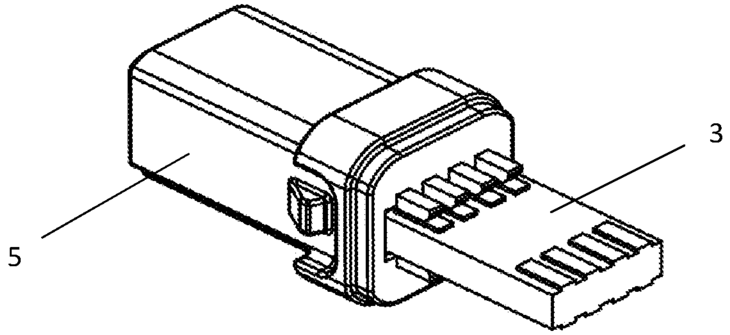
FIG. 9 is a schematic view of a speaker unit connector with a PCB, and FIG. 10 schematically illustrates a cut-through view of a speaker unit connector and housing connector in a mounted state.

FIG. 9 schematically illustrate a speaker unit connector 2 seen from the side not interfacing the housing connector 1, i.e. the backside. Here a PCB 3 extends from the main body 5 of the speaker unit connector 2. The PCB 3 provides an interface to the cable assembly 6 mentioned above. The cable assembly 6 is soldered to contacts on/in the PCB 3. The PCB 3 and (the ends of) the cable assembly 6 are overmolded so as to provide a stable mechanical connection.

Figure 10:
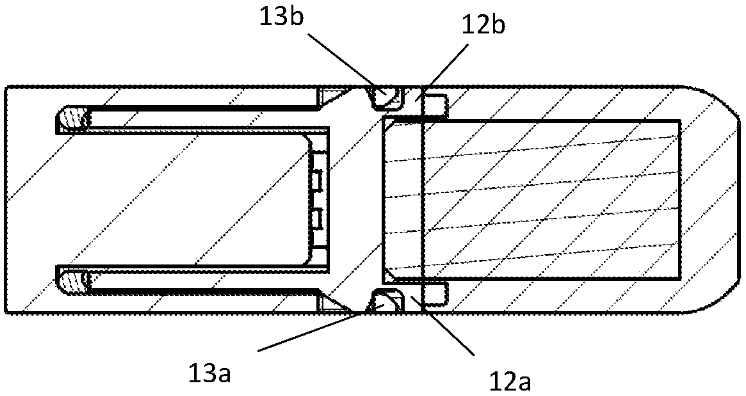

As is also seen here, the speaker unit connector 2 comprises a snap ridge 13*a* configured to receive a snap arm 12*a* of the housing connector 1. The snap arm is referred to as the loop structure 12*a* above, and the snap ridge is referred to as the protruding structure 13*a* above. This arrangement is contemplated to provide even further improved mechanical locking of the housing connector 1 and speaker unit connector 2. In FIG. 10, it is illustrated how the snap arm 12*a* interlocks with the snap ridge 13*a* in the mounted state.

Although not illustrated, a dome or tip may be attached to the in-the-ear housing to enhance the comfort for the user. Such a dome or tip may be made from a soft material, such as silicone, and provide a compliant interface to the ear canal. Further, the tip or dome provides some level of isolation from sound entering the ear canal. A vent canal may be provided in the tip or dome, such a vent canal could reduce the risk of occlusion.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

The invention claimed is:

1. A hearing aid comprising:

a behind-the-ear (BTE) housing comprising a housing connector, the BTE housing including an input transducer configured to convert acoustic sound into an electrical signal, the BTE housing comprising a processor configured to process the electrical signal in accordance with a hearing loss of a user, a detachable speaker unit having a speaker unit connector configured to mate with the housing connector, the detachable speaker unit comprising an output transducer arranged in an in-the-ear (ITE) housing, wherein the speaker unit connector comprises a first plurality of electrical contacts distributed at two inner surfaces of a speaker unit connector cavity, wherein the housing connector comprises a second plurality of housing connector contacts arranged in a housing connector cavity, the housing connector contacts extending into the housing connector cavity, the housing connector cavity and speaker unit connector electrical contacts configured to establish electrical contact when the speaker unit connector and the housing connector are in mechanical connection, and a hole cut out from a surface of one of the BTE housing and the speaker unit connector, and a protruding structure on an outer surface of the other of the BTE housing and the speaker unit connector, the protruding structure being configured to snap into the hole, wherein one or more of the first plurality of electrical contacts in the speaker unit connector is electrically connected to a corresponding sensor arranged in the ITE housing, said sensor being configured as an acceleration sensor, a temperature sensor, a PPG sensor, or a combination thereof.

2. The hearing aid according to claim 1, wherein housing connector comprises a centrally positioned part extending into the housing connector cavity and wherein the second plurality of housing connector contacts are arranged at the centrally positioned part, the centrally positioned part configured to be received in the speaker unit connector cavity.

3. The hearing aid according to claim 1, wherein the housing connector cavity comprises a first protrusion extending into the housing connector cavity, and the speaker unit connector comprises a track mating the first protrusion.

4. The hearing aid according to claim 3, wherein the housing connector cavity comprises a second protrusion extending into the housing connector cavity and the speaker unit connector comprises a second track mating the second protrusion, the first protrusion and the second protrusion arranged at a first side of the housing connector cavity.

5. The hearing aid according to claim 4, wherein the housing connector cavity has a rectangular cross-section geometry and the first protrusion and the second protrusion are arranged at respective corners of a long side of the rectangular cross-section geometry.

6. The hearing aid according to claim 1, wherein the speaker unit connector is provided with a gasket or sealing arranged to contact a surface of the housing connector in a mounted state.

7. The hearing aid according to claim 1, wherein the first plurality and the second plurality are equal or, alternatively, wherein the first plurality and the second plurality are not equal.

8. The hearing aid according to claim 1, wherein the first plurality and the second plurality is an even number or, alternatively, wherein the first plurality and the second plurality is an uneven number.

9. The hearing aid according to claim 1, wherein the speaker unit connector comprises an electrical component.

10. The hearing aid according to claim 1, wherein the in-the-ear housing comprises a second input transducer.

11. The hearing aid according to claim 1, wherein the hole is a first hole formed on the surface of the housing connector, and the protruding structure is a first protruding structure formed on the outer surface of the speaker unit connector, the housing connector comprises a second hole arranged at an opposite side of the first loop structure and the speaker unit connector comprises a second protruding structure arranged opposite the first protruding structure and shaped to contact the second hole.

12. A detachable speaker unit assembly having a speaker unit connector configured to mate with a housing connector of a behind-the-ear (BTE) hearing aid housing, the detachable speaker unit comprising:

an output transducer arranged in an in-the-ear (ITE) housing;

a first plurality of electrical contacts arranged within the speaker unit connector, the first plurality of electrical contacts being distributed at two inner surfaces of a speaker unit connector cavity; and one of a protruding structure formed on an outer surface of the plug housing of the speaker unit connector and shaped to snap into a hole cut out from a surface of the housing connector of the BTE housing, and a hole cut out from a surface of the plug housing shaped to be snapped into by a protruding structure formed on an outer surface of the housing connector, wherein one or more of the first plurality of electrical contacts in the speaker unit connector is electrically connected to a corresponding sensor arranged in the ITE housing, the sensor being configured as an acceleration sensor, a temperature sensor, a PPG sensor, or a combination thereof.

13. The detachable speaker unit assembly according to claim 12, wherein a multitude of electrical conductors are connected to a substrate in the speaker unit connector, and wherein the multitude of electrical conductors are assembled in a cable structure electrically and mechanically connecting the speaker unit connector with the ITE housing.

14. The hearing aid according to claim 2, wherein the speaker unit connector is provided with a gasket or sealing arranged to contact a surface of the housing connector in a mounted state.

15. The hearing aid according to claim 3, wherein the speaker unit connector is provided with a gasket or sealing arranged to contact a surface of the housing connector in a mounted state.

16. The hearing aid according to claim 4, wherein the speaker unit connector is provided with a gasket or sealing arranged to contact a surface of the housing connector in a mounted state.

17. The hearing aid according to claim 5, wherein the speaker unit connector is provided with a gasket or sealing arranged to contact a surface of the housing connector in a mounted state.

18. The detachable speaker unit assembly according to claim 12, wherein the housing connector cavity comprises a first protrusion extending into the speaker unit connector cavity, and the speaker unit connector comprises a track mating the first protrusion.

19. The detachable speaker unit assembly according to claim 12, wherein the speaker unit connector is provided with a gasket or sealing arranged to contact a surface of the housing connector in a mounted state.

* * * * *